(12) United States Patent
Kurstak et al.

(10) Patent No.: US 9,900,427 B2
(45) Date of Patent: Feb. 20, 2018

(54) ELECTRONIC DEVICE AND METHOD FOR DISPLAYING CALL INFORMATION THEREOF

(71) Applicant: Samsung Electronics Co., Ltd., Suwon-si, Gyeonggi-do (KR)

(72) Inventors: Sergii Kurstak, Kyiv (UA); Sergii Nechuiviter, Kyiv (UA); Oleksandr Shchur, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/834,921

(22) Filed: Aug. 25, 2015

(65) Prior Publication Data

US 2016/0065731 A1 Mar. 3, 2016

(30) Foreign Application Priority Data

Aug. 26, 2014 (KR) ........................ 10-2014-0111688

(51) Int. Cl.
| | |
|---|---|
| H04M 3/22 | (2006.01) |
| H04M 1/64 | (2006.01) |
| H04W 4/14 | (2009.01) |
| G06F 17/27 | (2006.01) |
| H04M 19/04 | (2006.01) |
| H04M 1/725 | (2006.01) |
| H04M 3/42 | (2006.01) |

(52) U.S. Cl.
CPC ...... *H04M 3/2218* (2013.01); *G06F 17/2745* (2013.01); *H04M 1/72519* (2013.01); *H04M 3/42221* (2013.01); *H04M 19/04* (2013.01); *H04M 3/42042* (2013.01); *H04M 2203/252* (2013.01); *H04M 2203/551* (2013.01)

(58) Field of Classification Search
CPC ............ H04M 19/04; H04M 1/72519; H04M 3/2218; H04M 3/42042
USPC ....................................... 455/414.1
See application file for complete search history.

(56) References Cited

U.S. PATENT DOCUMENTS

| | | | | |
|---|---|---|---|---|
| 8,606,576 B1* | 12/2013 | Barr | ................... | G10L 15/22 379/88.01 |
| 2011/0200181 A1* | 8/2011 | Issa | ................... | G06Q 10/10 379/93.01 |
| 2012/0253801 A1 | 10/2012 | Santos-Lang et al. | | |
| 2013/0019176 A1* | 1/2013 | Miyashita | ......... | G06F 17/30746 715/728 |
| 2014/0087687 A1* | 3/2014 | Brezina | ................ | H04M 15/00 455/405 |
| 2015/0172462 A1* | 6/2015 | Cudak | ................ | H04M 3/4365 455/413 |

* cited by examiner

*Primary Examiner* — Nathan Taylor
(74) *Attorney, Agent, or Firm* — Jefferson IP Law, LLP

(57) ABSTRACT

A method for displaying call information in an electronic device is provided. The method includes receiving speech from a user of the electronic device and speech from a call counterpart, extracting data from the received speech from the user and the received speech from the call counterpart, determining a topic of a call conversation, based on the extracted data, and displaying information about the determined topic of the call conversation together with a call history of the user of the electronic device.

18 Claims, 15 Drawing Sheets

FIG. 7A

```
USER1 : Hi! Mike!
USER : Hi!
USER1 : How are you?
USER : I am OK. Want something?
USER1 : Don't forget to buy some food after work.
USER : What exactly?
USER1 : Ohm... I want bread with salmon; we need some meat, maybe...
eggs, yes. And... butter for those salmon and bread, then...
we ran out of sugar, so buy sugar. Oh I want you to cook rice pilaf next week,
so buy rice for it. And don't forget about toilet paper.
USER : That's all?
USER1 : Yeah.
USER : See you.
USER1 : Bye.
```

FIG. 7B

```
USER1 : Hi! Mike! => Hi! Mike!
USER : Hi! => Hi!
USER1 : How are you? => How are you?
USER : I am OK. Want something? => I am OK. | Want something?
USER1 : Don't forget to buy some food after work. => Don't forget to buy some food after work.
USER : What exactly? => What exactly?
USER1 : Ohm... I want bread with salmon; we need some meat, maybe...
eggs, yes, And... butter for those salmon and bread, then...
we ran out of sugar, so buy sugar. Oh I want you to cook rice pilaf next week,
so buy rice for it. And don't forget about toilet paper. => Ohm... | I want
 bread with salmon; | we need some meat, maybe...
eggs, yes, | And... butter for those salmon and bread, | then...
we ran out of sugar, | so buy sugar. | Oh I want you to cook rice pilaf next week,
| so buy rice for it. | And don't forget about toilet paper.
USER : That's all? => That's all?
USER1 : Yeah. => Yeah.
USER : See you. => See you.
USER1 : Bye! => Bye!
```

FIG. 7C

USER1 : Hi! ▓▓▓
USER : Hi!
USER1 : How are you?
USER : I am OK. | Want something?
USER1 : Don't forget to ▓▓ some ▓▓▓▓ after work.
USER : What exactly?
USER1 : Ohm... | I want bread with salmon; | we need some meat, maybe...
eggs, yes, | And... butter for those salmon and bread, | then...
▓▓▓▓▓▓▓▓▓▓▓ sugar, | so ▓▓▓ sugar. | Oh I want you to cook rice pilaf next week,
| so ▓▓▓ rice for it. | And don't forget about toilet paper.
USER : That's all?
USER1 : Yeah.
USER : See you.
USER1 : Bye!

FIG. 7D

USER1 : Hi! ▓▓▓ @ (GREET)
USER : Hi! @ (GREET)
USER1 : How are you? @ (POLITENESS_FORMULA)
USER : I am OK. @(FEEDBACK_POSITIVE) Want something? @(REQUEST)
USER1 : Don't forget to ▓▓ some ▓▓▓ after work. @(REQUEST_COMMIT)
USER : What exactly? @(REQUEST_CLARIFY)
Ohm··· @(NOT_CLASSIFIABLE) I want bread with salmon; @(CLARIFY) we need some meat,
maybe··· eggs, yes. @(INFORM) And··· butter for those salmon and bread, @(CLARIFY) then···▓▓
▓▓▓▓▓ sugar, @(INFORM) so ▓▓ sugar. @(REQUEST_COMMIT) Oh, I want you to cook rice pilaf
next week, @(INFORM) so ▓▓ rice for it. @(REQUEST_COMMIT) And don't forget about
toilet paper. @(REQUEST_COMMIT)
USER : That's all? @(REQUEST)
USER1 : Yeah. @(FEEDBACK_POSITIVE)
USER : See you. @(CLOSE)
USER1 : Bye. @(BYE)

FIG. 7E

```
Fact type: Shopping list
Mandatory:
    • key-phrase, class: request, utterance label class: REQUEST_COMMIT
    • key-phrase, class: shopping
    • entity, class: product
Optional:
    • key-phrase, class: food
    • etc.

Confidence score: 0.9
Stored:
    • entities, class: product

Fact type "Shopping List" - threshold passed. Template assigned: Shopping list.

Generate template, filling with entities, class: product.
```

ELECTRONIC DEVICE AND METHOD FOR DISPLAYING CALL INFORMATION THEREOF

CROSS-REFERENCE TO RELATED APPLICATION(S)

This application claims the benefit under 35 U.S.C. § 119(a) of a Korean patent application filed on Aug. 26, 2014 in the Korean Intellectual Property Office and assigned Serial number 10-2014-0111688, the entire disclosure of which is hereby incorporated by reference.

TECHNICAL FIELD

The present disclosure relates to a method for displaying information, together with a call history, associated with call connections classified or summarized according to topics and also to an electronic device for implementing the method.

BACKGROUND

After a phone call with another person, it is not easy to recall a call conversation after some time. Therefore, a caller is often required to take a note of such a conversation.

Recently mobile devices have used a technique to store the content of a call conversation therein and to offer it to a user. Thanks to this technique, a user can easily remember a past call conversation.

Furthermore, a more advanced technique is now offering the summarized content of a stored call conversation to a user.

By the way, a call recording function currently offered in mobile devices has a drawback that a long time is required for a user to find a desired part in a recorded call conversation.

Additionally, in order to obtain a user's desired summary, a process of creating the summarized content from a call conversation should be performed in full consideration of various factors.

Also, in order to allow a user to remember a call conversation quickly, a display technique using various visualization materials is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a new method for classifying or summarizing data extracted from a speech of a user and from a speech of a call counterpart and then displaying the classified or summarized data together with a call history is provided.

Another aspect of the present disclosure is to provide a method for displaying such data through various visualization techniques.

Another aspect of the present disclosure is to provide an electronic device and method for displaying call information in view of the above matters.

In accordance with an aspect of the present disclosure, a method for displaying call information in an electronic device is provided. The method includes operations of receiving speech from a user of the electronic device and speech from a call counterpart, extracting data from the received speech from the user and the received speech from the call counterpart, determining a topic of a call conversation, based on the extracted data, and displaying information about the determined topic of the call conversation together with a call history of the user of the electronic device.

In accordance with another aspect of the present disclosure, an electronic device is provided. The electronic device includes a display module, a communication module configured to receive speech from a call counterpart, an audio module configured to receive speech from a user of the electronic device, and a control module configured to extract data from the received speech, to determine a topic of a call conversation, based on the extracted data, and to control the display module to display information about the determined topic of the call conversation together with a call history.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, 7C, 7D, and 7E are example views illustrating a process of extracting summary data from a conversation according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
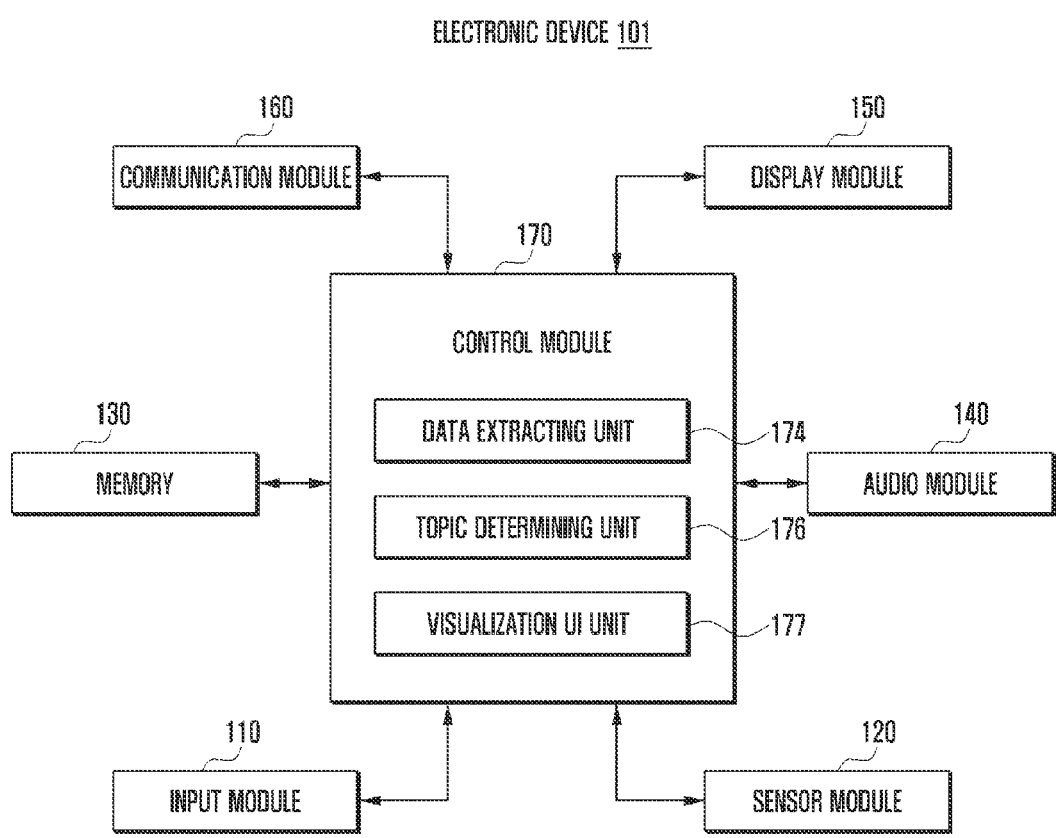
FIG. 1 is a block diagram illustrating an electronic device according to an embodiment of the present disclosure.

FIG. 1 is a block diagram illustrating an electronic device according to an embodiment of the present disclosure.

Referring to FIG. 1, the electronic device 101 may include an input module 110, a sensor module 120, a memory 130, an audio module 140, a display module 150, a communication module 160, and a control module 170.

The input module 110 may include a touch panel, a pen sensor (e.g., a digital pen sensor), a key, and an ultrasonic input unit. The touch panel may recognize a touch input in at least one of, for example, a capacitive scheme, a resistive scheme, an infrared scheme, and an acoustic wave scheme. Also, the touch panel may further include a control circuit. In a case of a capacitive type touch panel, the touch panel is capable of recognizing proximity as well as a direct touch. And also, the touch panel may further include a tactile layer. In this case, the touch panel may provide a tactile response to a user. According to an embodiment of the present disclosure, the electronic device 101 may also receive a user input from any external device or entity (e.g., a computer or a server) connected thereto through the communication module 160.

The sensor module 120 may measure a physical quantity and/or sense an operating state of the electronic device 101, and then may convert the measured or sensed information into an electric signal. The sensor module 120 may include, for example, at least one of a gesture sensor, a gyro sensor, an atmospheric pressure sensor, a magnetic sensor, an acceleration sensor, a grip sensor, a proximity sensor, a red, green and blue (RGB) sensor, a biometric sensor, a temperature/humidity sensor, an illuminance sensor, and an ultra violet (UV) sensor. Additionally or alternatively, the sensor module 120 may include, for example, an E-nose sensor, an electromyography (EMG) sensor, an electroencephalogram (EEG) sensor, an electrocardiogram (ECG) sensor, an infrared ray (IR) sensor, an iris sensor, a fingerprint sensor, and the like. The sensor module 120 may further include a control circuit for controlling one or more sensors included therein.

The memory 130 may store therein commands or data received from or created by the control module 170 or any other element (e.g., the input module 110, the sensor module 120, the audio module 140, the display module 150, the communication module 160, or the like). The memory 130 may include, for example, programming modules, such as a kernel, a middleware, an application programming interface (API), an application, and/or the like. Each of the above programming modules may be implemented in software, firmware, hardware, or a combination of two or more thereof. For example, the control module 170 may be implemented in hardware on a processor, a circuit module, a semiconductor or a system on chip (SoC), in software such as an application program, or in firmware by a combination thereof.

The audio module 140 may convert a sound into an electric signal, and vice versa. At least part of the audio module 140 may be contained in, for example, an input/output interface. The audio module 140 may process sound information that is input into or output from, e.g., a speaker, a receiver, an earphone, and/or a microphone. For example, the control module 170 may output voice data, processed by the audio module 140, to a user through the speaker. Also, the audio module 140 may convert a voice, collected by the microphone, into an electric signal and then transmit it to a call log unit 171 which will be discussed later.

The display module 150 may visually offer various kinds of information (e.g., multimedia data, text data, etc.) to a user. The display module 150 may include a panel, a hologram, or a projector. The panel may be a liquid crystal display (LCD), an active matrix organic light emitting diode (AM-OLED), or the like. The panel may be implemented so as to be, for example, flexible, transparent, or wearable. The panel may be integrated with the touch panel to form a single module. The hologram may display a three-dimensional image in the air by using interference of light. The projector may display an image by projecting light onto a screen which is located inside or outside the electronic device 101. According to an embodiment of the present disclosure, the display module 150 may further include a control circuit for controlling the panel, the hologram, or the projector.

The communication module 160 may perform data transmission/reception in a communication with any other electronic device (e.g., a computing device, a server, etc.) connected to the electronic device 101 through a network. According to an embodiment of the present disclosure, the communication module 160 may include a cellular module, a wireless fidelity (Wi-Fi) module, a bluetooth (BT) module, a global positioning system (GPS) module, a near field communication (NFC) module, and a radio frequency (RF) module.

The control module 170 may determine a topic of a conversation by extracting data from a speech received from a user of the electronic device and/or from a call counterpart, and may also display, on the display module 150, information associated with the determined topic together with a call history. Such topic-associated information may include data (e.g., speech data of an analog or digital form) extracted from a speech, text data converted from speech data, summary information about data, a summary data subset such as various user interface (UI) items including data summary information, and the like. The control module 170 may store information associated with a topic in the memory 130 and also display the stored information through the display module 150. A detailed description about the control module 170 will be given below with reference to FIGS. 2 and 3.

Although not shown in FIG. 1, the electronic device 101 may further include other elements such as a bus, an input/output interface, a communication interface, a subscriber identity module (SIM) card, a slot, a camera module, an indicator, a motor, a power management module, a batter, and the like.

Figure 2:
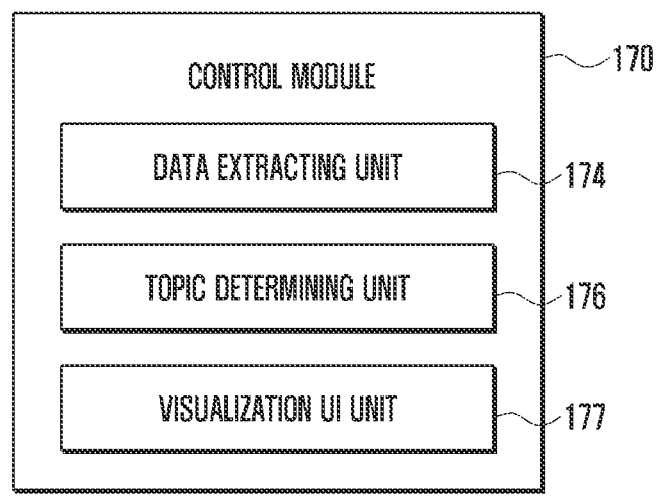
FIG. 2 is a block diagram illustrating a control module of an electronic device according to an embodiment of the present disclosure.
Figure 3:
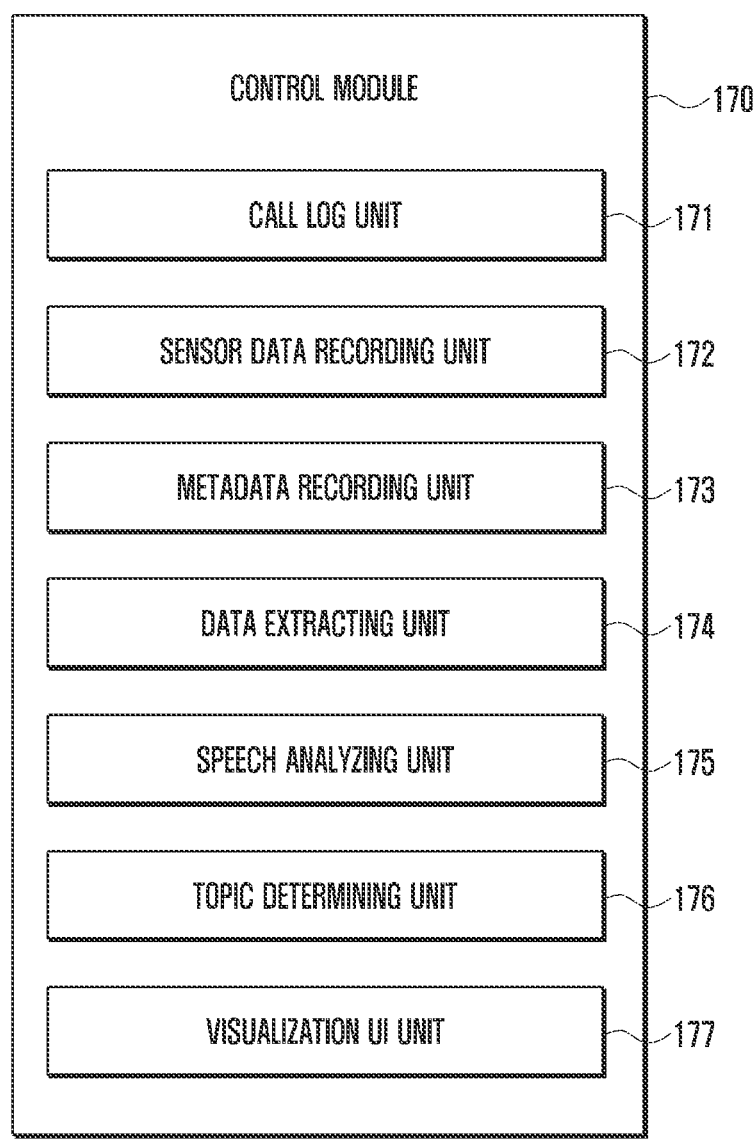
FIG. 3 is a block diagram illustrating a control module of an electronic device according to an embodiment of the present disclosure.

FIGS. 2 and 3 are block diagrams illustrating the control module 170 of the electronic device according to various embodiments of the present disclosure.

Referring to FIGS. 2 and 3, the control unit 170 may include a data extracting unit 174, a topic determining unit 176, and a visualization UI unit 177. Additionally, the control unit 170 may further include at least one of a call log unit 171, a sensor data recording unit 172, a metadata recording unit 173, and a speech analyzing unit 175.

The call log unit 171 may receive an audio signal from the communication module 160 or the audio module 140 (e.g., outputted from the microphone or to be inputted to the speaker). The call log unit 171 may extract speech data from the received audio signal.

According to an embodiment of the present disclosure, the call log unit 171 may be formed in the control module 170 or in any other module such as the communication module 160. Speech data extracted by the call log unit 171 may be stored in the memory 130 or transmitted to any other module in the electronic device 101. For example, the electronic device 101 may transmit the audio signal or speech data, received or converted by the call log unit 171, to the data extracting unit 174.

The sensor data recording unit 172 may receive sensor data from the sensor module 120 of the electronic device 101. Specifically, the sensor data recording unit 172 may receive sensor data from at least one of a gesture sensor, an IR sensor, an atmospheric pressure sensor, a magnetic sensor, a grip sensor, a proximity sensor, a color sensor, a biometric sensor, a temperature/humidity sensor, an illuminance sensor, a gyro sensor, a touch sensor, a pressure sensor, an acceleration sensor, a GPS, or an acoustic sensor. The sensor data recording unit 172 may be formed independently in the control module 170 or formed by using the sensor module 120 and the memory 130. For example, the electronic device 101 may perform a function of the sensor data recording unit 172 by enabling the sensor module 120 to receive sensor data and store it in the memory 130.

According to an embodiment of the present disclosure, sensor data may include data recognized by the sensor module 102 in a call connection with any other electronic device. The control module 170 may receive a signal of a communication connection with a user of any other electronic device from the communication module 160. From then on, the control module 170 may store sensor data, received from the sensor module 120, as specific data in the memory 130. For example, user's location information such as GPS data is one of sensor data to be used by the control module 170.

Electronic device 101 may store at least one sensor data received from the sensor data recording unit 172 in the memory 130 or transmit to any other module in the electronic device 101. For example, the electronic device 101 may transmit the sensor data, received from the sensor data recording unit 172, to the data extracting unit 174.

The metadata recording unit 173 may receive data, incapable of being received in a call connection, from other module of the electronic device 101 or from a web server or other electronic device on a network through the communication module 160. For example, metadata may be log information of a previous call (e.g., a caller name, a caller phone number, a call time, etc.), speech data stored in the memory 130, text data stored in the memory 130, data received through an application (for providing, e.g., short message service (SMS)/multimedia message service (MMS), email, calendar, alarm, information about atmosphere, humidity and/or temperature, etc.), data received through the communication module 160, data received through the Internet, data received through social networking service (SNS), a user access log stored in the memory 130, or the like. Metadata received from the metadata recording unit 173 may be stored in the memory 130 or transmitted to any other module in the electronic device 101. For example, the electronic device 101 may transmit the metadata, received from the metadata recording unit 173, to the data extracting unit 174.

The data extracting unit 174 may receive a speech of a call counterpart through the call log unit 171 or a speech of a user of the electronic device 101 through the microphone of the audio module 140, and then extract data from the received speech. The extracted data may be text data or summary data thereof.

According to an embodiment of the present disclosure, the data extracting unit 174 may convert at least one of speech data, received from or to be transmitted to the memory 130, the call log unit 171, the microphone or the speaker, into text data. The data extracting unit 174 may be realized on the basis of a speech recognition engine using a cloud (i.e., computing technique based on the Internet) or any separate speech recognition device. For example, the data extracting unit 174 may be implemented in hardware or software in the electronic device 101 using various speech recognition algorithms well known in the art. Additionally, the data extracting unit 174 may be used locally in the electronic device 101 or used in the form of plug-in on a web browser. In the latter case, the data extracting unit 174 may operate together with a web browser. Text data or summary data extracted by the data extracting unit 174 may be stored in the memory 130 or transmitted to any other module in the electronic device 101. For example, the electronic device 101 may transmit such text data or summary data, extracted by the data extracting unit 174, to the topic determining unit 176.

According to an embodiment of the present disclosure, the data extracting unit 174 may use various well-known algorithms based on natural language processing technique. For example, the data extracting unit 174 may use text mining technique to find meaningful information from atypical text data composed of natural languages. Also, the data extracting unit 174 may use, but not limited to, summary confidence scoring technique, N-best list technique, text classification technique, etc. as examples of natural language processing technique.

According to an embodiment of the present disclosure, the data extracting unit 174 may extract summary data from text data through text extracting technique or feature extraction technique in the field of text mining. Additionally, the data extracting unit 174 may use summary confidence scoring technique, N-best (or N-gram) technique, etc. so as to extract information. For example, the data extracting unit 174 may create summary data by extracting a pattern of text data converted using N-best technique as one of summary algorithms.

The data extracting unit 174 may extract text data from a speech of a user of the electronic device 101 and/or from a speech of a call counterpart. Then the data extracting unit 174 may extract at least one summary data from the extracted text data. Also, the data extracting unit 174 may extract summary data by mapping between data speech-recognized using certain database (DB) information and data stored in the DB information. Summary data may be at least one keyword or a combination of keywords including at least one specific keyword. For example, summary data may be, but not limited to, a conversation record, conversation information (e.g., time, location, call duration, etc.), a list of persons mentioned in a conversation, a profile of a person mentioned in a conversation, a location mentioned in a conversation, a profile of a location mentioned in a conversation, summary information about a discussed incident, or any other related information. The extracted text data or summary data may be stored in the memory 130 or transmitted to the topic determining unit 176.

According to an embodiment of the present disclosure, in a case of having a function of the topic determining unit 176, the data extracting unit 174 may extract summary data from text data according to topics on the basis of a predefined user parameter. For example, in order to summary a call conversation according to topics, the data extracting unit 174 may use both a natural language processing algorithm and a predefined user parameter. The predefined user parameter may be, for example, the frequency of text, a user's access log of the electronic device, and/or metadata recorded in the electronic device. In addition, the predefined user parameter may be a confidence score threshold, a manual filtering by concrete type of templates selecting via UI options menu, the maximum number of possible templates to display per call log, etc.

According to an embodiment of the present disclosure, in a case of having a function of the topic determining unit 176, the data extracting unit 174 may create summary data according to topics on the basis of at least one of sensor data received from the sensor data recording unit 172 and speech analysis data received from the speech analyzing unit 175.

According to an embodiment of the present disclosure, in a case of having a function of the topic determining unit 176, the data extracting unit 174 may offer information, such as text data or summary data extracted from a speech, to a user and then receive a topic about the offered information from a user.

For example, the electronic device 101 may transmit sensor data to the data extracting unit 174, and then the data extracting unit 174 may extract sensor data associated with a call conversation through a data processing process of the received sensor data. The data extracting unit 174 may extract sensor data associated with call information through the data processing process or receive such data from the memory 130. For example, the data extracting unit 174 may receive location data of a user of the electronic device 101 from the GPS sensor and then create integrated data including the received user location data and text information. Also, the data extracting unit 174 may create summary data by analyzing the integrated data and referring to sensor data (e.g., user location information) contained in the integrated data in a process of classifying text data, extracting information from text data, or determining template.

According to an embodiment of the present disclosure, in a case of having a function of the topic determining unit 176, the data extracting unit 174 may receive metadata associated with call information and then create integrated data including the received metadata and text information. Additionally, the data extracting unit 174 may create integrated data including text data, sensor data associated with call information, and metadata associated with call information. Also, the data extracting unit 174 may create summary data from the created integrated data, based on a predefined user parameter as discussed above.

Metadata associated with call information may be, for example, a history of communication with persons in a contact list, a frequency of calls, or a timestamp of a call. For example, if the user B of other electronic device makes a call to the user A of the electronic device 101 so as to fix a time for a meeting almost every day, the electronic device 101 may determine first a topic of a meeting type on the basis of integrated data including statistic metadata when creating summary data about a history of calls with the user B. Once a meeting type template is selected, the electronic device 101 may create words associated with a meeting (i.e., summary data) in a structured form by using a summarizing algorithm of the meeting type template. Then the structured summary data and the template may be stored in the memory 130 or displayed through the display module 150.

According to an embodiment of the present disclosure, in a case of having a function of the topic determining unit 176, the data extracting unit 174 may create summary data by using various types of data which can be received in the electronic device 101, such as speech analysis data received from the speech analyzing unit 175 as well as text data, sensor data and metadata. Further, the data extracting unit 174 may perform an initial processing of text data, sensor data, metadata, or speech data. Also, the data extracting unit 174 may integrate information of text data, sensor data, metadata, or speech data. And also, the data extracting unit 174 may consider converted text data, sensor data, metadata, or speech data. By integrating or referring to various data as discussed above, the data extracting unit 174 may effectively extract a topic of a conversation and topic-related information from a speech. The electronic device 101 may store, in the memory 130, the data extracted by the data extracting unit 174, the topic determined by the data extracting unit 174, or information (e.g., template, etc.) associated with the determined topic.

The speech analyzing unit 175 may analyze audio signals stored in the memory 130 or received or to be transmitted through the call log unit 171, the microphone, or the speaker. For example, the speech analyzing unit 175 may analyze intonation, speed, tempo, echo, or delay of such audio signals and/or sound signals occurring in the vicinity.

For example, the speech analyzing unit 175 may create digitized data by measuring pitch (i.e., the frequency of the vocal cords), strength (i.e., the magnitude of energy), etc. of a user's speech signal during a call connection. The speech analyzing unit 175 may be realized in hardware or software by using well-known technique. Speech analysis data obtained by the speech analyzing unit 175 may be stored in the memory 130 or transmitted to any other module in the electronic device 101. For example, the electronic device 101 may transmit such speech analysis data to the data extracting unit 174. By referring to such analysis data received from the speech analyzing unit 175, the electronic device 101 may determine a specific topic of a call conversation.

The topic determining unit 176 may determine, from at least one of text data and summary data extracted by the data extracting unit 174, a topic of a superordinate concept including the text data and/or the summary data.

According to an embodiment of the present disclosure, the topic determining unit 176 may determine at least one topic by means of a user parameter. For example, a user parameter may include a frequency of text, an access log of a user of the electronic device, metadata recorded in the electronic device, or the like.

According to an embodiment of the present disclosure, the topic determining unit 176 may determine at least one topic associated with summary data, based on the priority or frequency of text constituting the summary data. Using a well-known algorithm, the electronic device 101 may count the frequency, etc. of text constituting summary data.

According to an embodiment of the present disclosure, the topic determining unit 176 may determine a topic of a call conversation, based on at least one of speech analysis data and sensor data associated with call information. The topic determining unit 176 may receive such sensor data associated with call information from the sensor data recording unit 172 and receive such speech analysis data from the speech analyzing unit 175.

According to an embodiment of the present disclosure, the topic determining unit 176 may offer text data or summary data, received from the data extracting unit 174, to a user and then receive an input of a topic associated with call information from a user. Then the topic determining unit 176 may store, in the memory 130, such a topic input and text data or summary data associated with the topic input.

According to an embodiment of the present disclosure, the topic determining unit 176 may determine the priority of text, based on at least one of metadata, sensor data, and speech analysis data.

According to an embodiment of the present disclosure, the topic determining unit 176 may determine at least one template corresponding to the determined topic. In this case, the topic determining unit 176 may insert text data or summary data into the determined template. Through this, the topic determining unit 176 may classify summary data of a call conversation in a structured form according to topics of the call conversation. In this process of determining a template, the electronic device 101 may receive necessary information from the program region or data region of the memory 130, a resource of a related application program, or the like.

According to an embodiment of the present disclosure, the topic determining unit 176 may classify text data or summary data according to specific topics through text classification technique and then create a template corresponding to such topics. This template may be a sort of application program that may be purchased at an application store. The electronic device 101 may receive information about at least one template through a designer, a user, an application, etc. thereof. The electronic device 101 may store the received template information in the memory 130.

According to an embodiment of the present disclosure, the topic determining unit 176 may create at least one summary data classified by at least one topic on the basis of a template-based calculation algorithm. For example, the topic determining unit 176 may create at least one template corresponding to a topic, such as, but not limited to, a meeting, a reservation, a shopping, a business, or a profile, and then classify text data. The topic determining unit 176 may classify text data by inserting the text data into the created template, and extract summary data from such text data classified according to templates through a summary algorithm (e.g., summary confidence scoring technique, N-best technique, summary extraction algorithm, etc.) of such a template.

Additionally, the topic determining unit 176 may simultaneously create a plurality of templates corresponding to a plurality of topics. Each template may create summary data structured from text data through a summary algorithm and a confidence score of the summary data. The topic determining unit 176 may select one of the created templates in response to a user input and then output the selected template to the display module 150. Also, the electronic device 101 may selectively display a template only having a confidence score of predetermined threshold or more. Alternatively, the electronic device 101 may select a template, based on the maximum number of summary data or the maximum number of templates. In addition, the topic determining unit 176 may determine a template from among the simultaneously created templates in response to a user's selection.

According to an embodiment of the present disclosure, the topic determining unit 176 may create a plurality of templates corresponding to one topic, based on the user's predetermined number of templates. For example, the electronic device 101 may receive an input of the maximum number of selectable templates corresponding to one topic from a user, and the topic determining unit 176 may create at least one template by restricting the number of templates capable of being created per call log according to the input of the maximum number of templates.

According to an embodiment of the present disclosure, the topic determining unit 176 may use certain DB information so as to classify text data and determine summary data or a template. For example, the topic determining unit 176 may use data information received from each module and stored in the memory 130, DB information of an application (e.g., a dictionary, etc.), DB information capable of being received via the communication module 160, or external DB information through a web.

According to an embodiment of the present disclosure, the topic determining unit 176 may receive sensor data associated with call information and create integrated data including text data and the received sensor data. The topic determining unit 176 may create integrated data by extracting data associated with a call log from text data and sensor data through a data processing process. The topic determining unit 176 may determine a topic of a call conversation by referring to integrated data. Alternatively, without creating separate integrated data, the topic determining unit 176 may determine a topic of a call conversation by referring to at least one sensor data associated with a call log in a process of creating summary data from text data. A process of creating the integrated data may be performed at the data extracting unit 174 as well as the topic determining unit 176.

The data extracting unit 174 and the topic determining unit 176 may be made in the form of a single module. The electronic device 101 may extract data from a speech of a user and/or a speech of a call counterpart. Simultaneously or sequentially, the electronic device 101 may determine a topic of a call conversation and then display the determined topic and related information (e.g., text data, summary data, and/or a summary data subset).

The visualization UI unit 177 may process information associated with a topic determined by the data extracting unit 174 or the topic determining unit 176. Namely, the visualization UI unit 177 may create at least one summary data subset from information corresponding to a call topic. The visualization UI unit 177 may create a summary data subset in the form of various UI items such as text, template, icon, emoticon, thumbnail, table, chart, graph, or map. Through this, the visualization UI unit 177 may create a structured summary data subset from information associated with a call topic. Additionally, the visualization UI unit 177 may create a summary data subset by varying brightness, color and chroma of text corresponding to a part or all of summary data.

The electronic device 101 may receive DB information from the memory 130, an application, other electronic device through the communication module 160, or a web and then transmit the received DB information to the visualization UI unit 177. Then, based on the received information, the visualization UI unit 177 may create a summary data subset. The created summary data subset may be stored in the memory 130 or displayed through the display module 150. The visualization UI unit 177 may be formed independently of both the data extracting unit 174 and the topic determining unit 176 as shown, or alternatively formed together with both.

According to an embodiment of the present disclosure, the electronic device 101 may determine whether to receive a request signal for additional information (e.g., a summary data subset, etc.) associated with a topic from a user. For example, the electronic device 101 may allow at least one structured summary data subset to be clickable through the display module 150. When any additional information signal (e.g., a click signal of a summary data subset) is received, the electronic device 101 may display at least one template through the display module 150. Such a template may be displayed together with a summary data subset or summary data on the display module 150. In addition, when such an additional information signal is received, the electronic device 101 may execute at least one application associated with a summary data subset. The electronic device 101 may predetermine such an application, in connection with a structured summary data subset, to be executed in response to the reception of an additional information signal.

Figure 4:
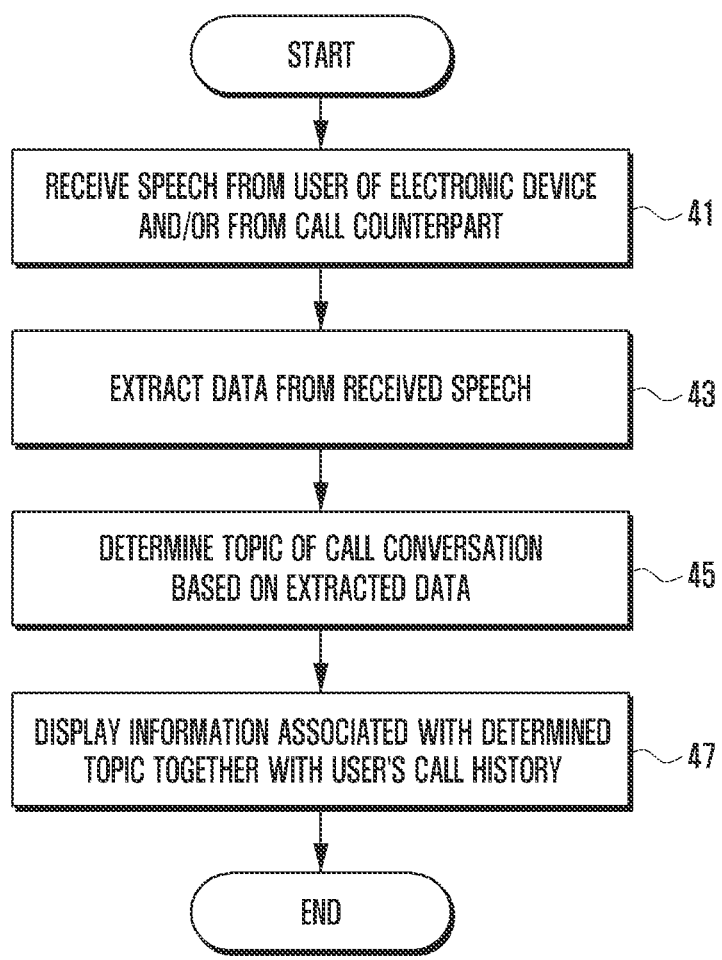
FIG. 4 is a flow diagram illustrating a method for displaying information, together with call history information, associated with topics of call information according to an embodiment of the present disclosure.

FIG. 4 is a flow diagram illustrating a method for displaying information, together with call history information, associated with topics of call information according to an embodiment of the present disclosure.

Referring to FIG. 4, according to an embodiment of the present disclosure, at operation 41, the electronic device 101 may receive a speech from a user thereof and/or from a call counterpart. For example, the electronic device 101 may receive an electric signal converted from a speech of a user of the electronic device 101 or of a call counterpart at the communication module 160 or the audio module 140.

According to an embodiment of the present disclosure, at operation 43, the electronic device 101 may extract data from the received speech. For example, using speech recognition technique, the electronic device 101 may extract text data from the received speech. Also, using a text classification algorithm, the electronic device 101 may extract summary data from the extracted text data. Alternatively, the electronic device 101 may directly extract summary data from speech data by mapping text data extracted using speech recognition technique to previously stored DB information.

For example, the electronic device 101, e.g., the data extracting unit 174 thereof, may extract text data from at least one speech data that can be received from or transmitted to the memory 130, the call log unit 171, the microphone, or the speaker. Such extracted text data may be stored in the memory 130 or transmitted to other module in the electronic device 101.

Additionally, the electronic device 101 may extract summary data from text data by using a predefined user parameter. For example, the electronic device 101 may create at least one summary data during or after a call, based on text data extracted by the data extracting unit 174. The predefined user parameter may be at least one of a frequency threshold of text constituting text data, an access log of a user of the electronic device, and metadata recorded in the electronic device. Also, the predefined user parameter may be a confidence score threshold, a manual filtering by concrete type of templates selecting via UI options menu, the maximum number of possible templates to display per call log, etc. Further, the electronic device 101 may receive an input of a predefined user parameter from a user through a UI menu. In a process of extracting summary data from text data by using a predefined user parameter, the electronic device 101 may use various well-known algorithms based on natural language processing.

According to an embodiment of the present disclosure, at operation 45, the electronic device 101 may determine a topic of a conversation, based on the extracted data. For example, the electronic device 101 may receive, from a web or stored DB, a plurality of superordinate summary data classified as a superordinate concept of the summary data extracted from a speech, and then determine the most frequently received superordinate summary data as a topic of a conversation. Similarly, the electronic device 101 may receive, from a web or stored DB, a plurality of superordinate text data classified as a superordinate concept of the text data extracted from a speech, and then determine the most frequently received superordinate text data as a topic of a conversation.

According to an embodiment of the present disclosure, the electronic device 101 may determine at least one topic from summary data according to a predetermined rule such as the priority or frequency of text constituting summary data. The electronic device 101 may determine the priority of text, based on at least one of metadata, sensor data, and speech analysis data. For example, the electronic device 101 may receive, from a web or stored DB, a plurality of superordinate summary data classified as a superordinate concept of the summary data extracted from a speech. From the received superordinate summary data, the electronic device 101 may determine one superordinate summary data as a topic of a conversation according to pre-stored priority information about text. For example, if superordinate summary data "meeting", "shopping" and "location" are received several times respectively and also if text "president" is stored with the first priority, the electronic device 101 may determine, as a topic of a conversation, "meeting" which is a superordinate summary data of summary data "president" regardless of the number of each received supper ordinate summary data.

According to an embodiment of the present disclosure, the electronic device 101 may determine automatically a topic of a conversation, based on the received summary data or superordinate summary data and at least one of metadata, sensor data, or speech analysis data received from the respective modules of the electronic device 101. For example, if the received superordinate concept information is "meeting" and "shopping" and also if user location information received as sensor data during a call connection is "department store", "shopping" may be determined as a topic of a conversation regardless of the number of received superordinate concept information.

According to an embodiment of the present disclosure, the electronic device 101 may receive the priority of text or a topic of a conversation from a user through the display module 150. For example, in a case of failing to determine a topic of a conversation from the extracted data, the electronic device 101 may display the extracted data through the display module 150 and allow a user to select a topic of a call conversation.

According to an embodiment of the present disclosure, at operation 47, the electronic device 101 may display information associated with the determined topic together with a call history. For example, information associated with the determined topic may include text about a topic or a summary data subset associated with the topic (e.g., a topic of a conversation, a part of summary data which is a subordinate concept of such a topic, a UI item associated with a topic such as template, icon, emoticon, thumbnail, table, chart, graph, or map). Additionally, the electronic device 101 may create a summary data subset by varying brightness, color and chroma of text corresponding to a part or all of summary data. The electronic device 101 may receive DB information from the memory 130, an application, other electronic device through the communication module 160, or a web and then create a summary data subset based on the received information. By displaying information associated with a topic together with a user's call history, the electronic device 101 may offer visual and intuitive information such that a user can easily remember a call conversation.

Figure 5:
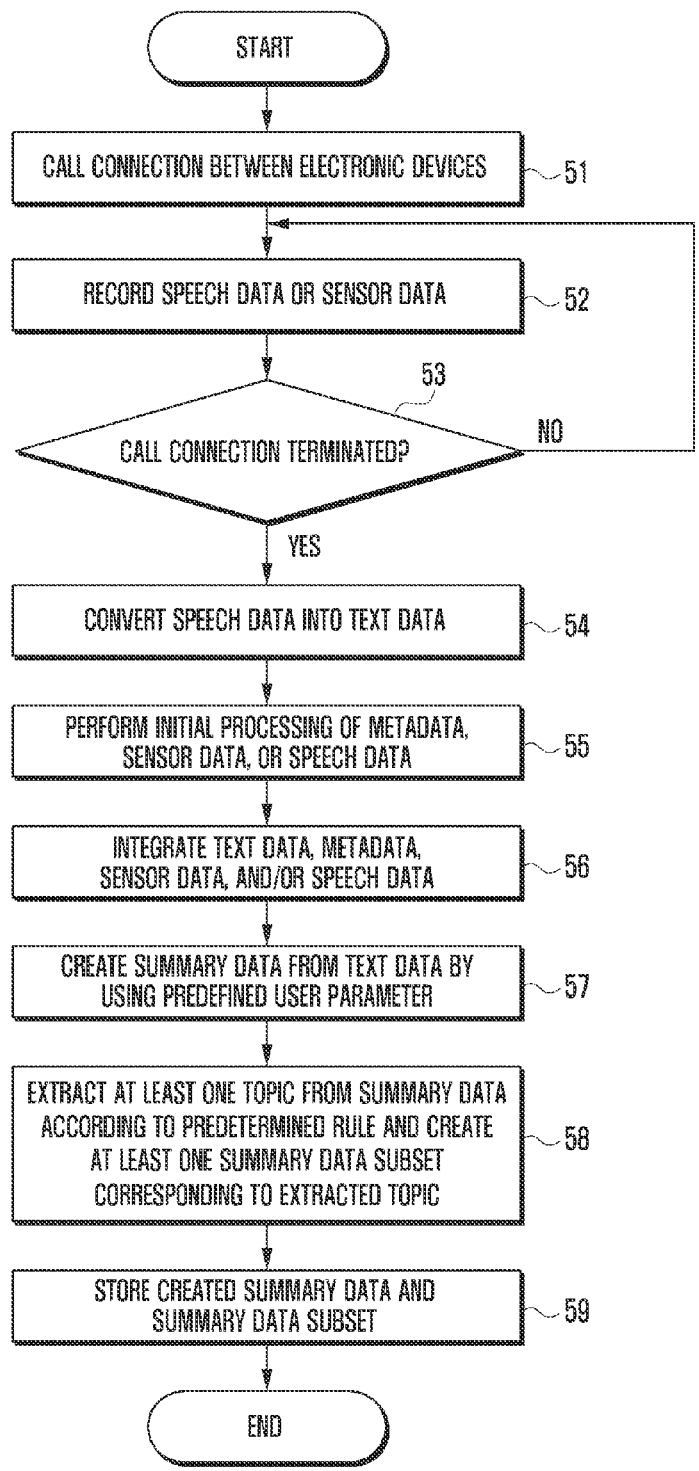
FIG. 5 is a flow diagram illustrating a method for creating summary data of call information and a summary data subset according to an embodiment of the present disclosure.

FIG. 5 is a flow diagram illustrating a method for creating summary data of call information and a summary data subset according to an embodiment of the present disclosure.

Referring to FIG. 5, according to an embodiment of the present disclosure, at operation 51, the electronic device 101 may establish a call connection with any other electronic device. This call connection may include a voice call, a video call, or a conference call.

According to an embodiment of the present disclosure, at operation 52, the electronic device 101 may record speech data received from or transmitted to other electronic device. For example, the electronic device 101 may create speech data by digitalizing an analog audio signal received through the call log unit 171.

According to an embodiment of the present disclosure, at operation 53, the electronic device 101 may determine whether the call connection is terminated. If the call connection is not terminated, the electronic device 101 may continuously perform operation 52.

If the call connection is terminated, the electronic device 101 may convert speech data into text data at operation 54. For example, the electronic device 101 may control the data extracting unit 174 to convert user's speech data, received or transmitted during the call connection, into text data. For example, the data extracting unit 174 may convert at least one of speech data, received or transmitted through the memory 130, the call log unit 171, or the microphone, into text data by using well-known speech recognition technique.

According to an embodiment of the present disclosure, at operation 55, the electronic device 101 may perform an initial processing of metadata, sensor data, or speech data. Through a data processing process of metadata, sensor data, or speech data, the electronic device 101 may extract non-speech data associated with a call conversation. For example, the electronic device 101 may extract sensor data such as user location from the GPS thereof during a call connection. For example, the electronic device 101 may extract background noise information by analyzing speech data received during a call connection. Through this, the electronic device 101 may collect surrounding environment information in a call connection between users.

According to an embodiment of the present disclosure, at operation 56, the electronic device 101 may integrate text data, metadata, sensor data, and/or speech data. As discussed above, the electronic device 101 may integrate text data, metadata, sensor data, and/or speech data into single data through a data processing process.

According to an embodiment of the present disclosure, at operation 57, the electronic device 101 (e.g., the control module 170 thereof) may create summary data from text data by using a predefined user parameter. The electronic device 101 may use, as a user parameter, at least one of a frequency threshold of text constituting text data, an access log of a user of the electronic device, and metadata recorded in the electronic device. Also, the electronic device 101 may user, as a predefined user parameter, a confidence score threshold, a manual filtering by concrete type of templates selecting via UI options menu, the maximum number of possible templates to display per call log, etc. Further, the electronic device 101 may receive an input of a predefined user parameter from a user through UI menu displayed on the display module 150. In a process of extracting summary data from text data by using a predefined user parameter, the electronic device 101 may use various well-known algorithms based on natural language processing. Also, the electronic device 101 may perform such a data processing by using sensor data or metadata in addition to the natural language processing algorithm.

According to an embodiment of the present disclosure, in a process of creating summary data from text data, the electronic device 101 may refer to metadata, sensor data, or speech data as a user parameter. Additionally, the electronic device 101 may refer to integrated data of operation 56 as a user parameter.

According to an embodiment of the present disclosure, at operation 58, the electronic device 101 may extract at least one topic from summary data according to a predetermined rule and then create at least one summary data subset corresponding to the extracted topic.

For example, the electronic device 101 may extract at least one topic from summary data, based on the priority or frequency of text constituting the summary data. The electronic device 101 may determine the priority of text, based on at least one of metadata, sensor data, and speech data. For example, in case the summary data corresponds to various topics such as meeting, appointment, or location, the electronic device 101 may extract one topic from such topics on the basis of location information received from the GPS. In a case of failing to determine the priority of text based on at least one of metadata, sensor data, and speech data, the electronic device 101 may receive a user's input regarding the priority of text or a topic of summary data through the display module 150. The electronic device 101 may check the frequency of text constituting summary data by using a well-known algorithm. For example, if summary data corresponds to various topics, the electronic device 101 may select a topic associated with specific text having the highest frequency.

Additionally, the electronic device 101 may create a summary data subset corresponding to the extracted topic. The electronic device 101 may create a summary data subset in the form of various UI items such as text, template, icon, emoticon, thumbnail, table, chart, graph, or map. Through this, the visualization UI unit 177 may create a structured summary data subset from summary data or a template. Additionally, the visualization UI unit 177 may create a summary data subset by varying brightness, color and chroma of text corresponding to a part or all of summary data. The electronic device 101 may receive DB information from the memory 130, an application, other electronic device through the communication module 160, or a web and then transmit the received DB information to the visualization UI unit 177. Then, based on the received information, the visualization UI unit 177 may create a summary data subset according to a predefined rule.

According to an embodiment of the present disclosure, the electronic device 101 may determine at least one template corresponding to at least one topic extracted according to a predefined rule. The determined template may be used as a summary data subset corresponding to the at least one extracted topic. The electronic device 101 may insert the created summary data information into the at least one determined template. Through this, the topic determining unit 176 may classify summary data in a structured form. The electronic device 101 may receive necessary template information from the program region or data region of the memory 130, a resource of a related application program, or the like. The electronic device 101 may perform text recognition by using text data, metadata, sensor data, or speech data, and then determine a template associated with the recognized text. For example, the electronic device 101 may determine a suitable template for the presentation of summarized content, and insert summary data in the template. Summary data may be associated with a template selected in view of a user parameter.

According to an embodiment of the present disclosure, the electronic device 101 may create summary data classified by at least one topic on the basis of a template-based calculation algorithm. This template-based calculation algorithm may classify text data into templates corresponding to at least one topic and then create summary data from the classified text data. For example, the electronic device 101 may classify text data by using the template-based calculation algorithm, and extract summary data from such text data according to a summary algorithm (e.g., summary confidence scoring technique, N-best technique, summary extraction algorithm, etc.) of such a template corresponding to the classified text data.

According to an embodiment of the present disclosure, the electronic device 101 may simultaneously create a plurality of templates so as to create summary data from text data. Each template may create summary data structured from text data through a summary algorithm and a score of the summary data. The electronic device 101 may select one of the created templates, based on a predefined user parameter, and then display the selected template through the display module 150. For example, the electronic device 101 may selectively display structured summary data only having a score of predetermined threshold or more among respective templates. Alternatively, the electronic device 101 may select summary data or a template, based on the maximum number of summary data or the maximum number of templates. In addition, the electronic device 101 may determine a template from among the simultaneously created templates in response to a user's selection.

According to an embodiment of the present disclosure, at operation 59, the electronic device 101 may store the created summary data and the summary data subset in the memory 130.

Figure 6:
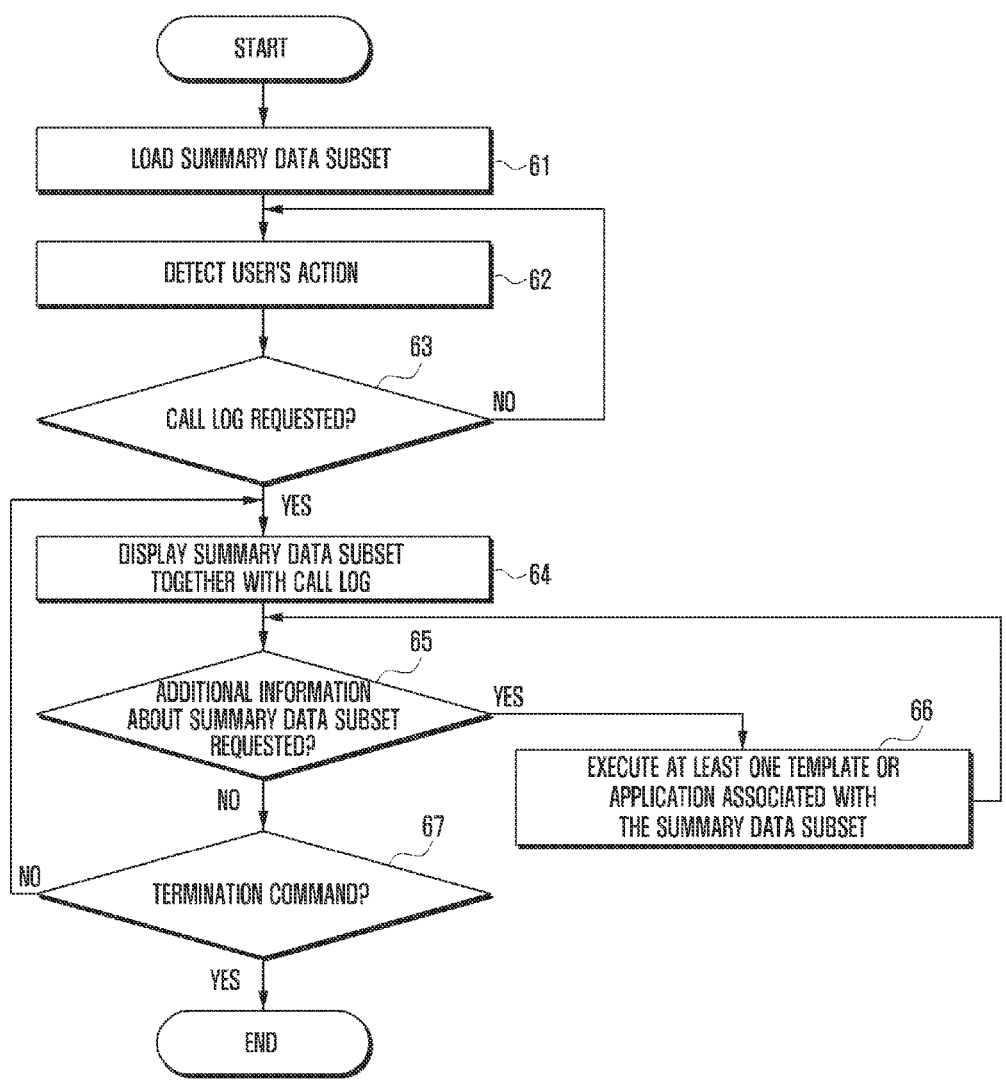
FIG. 6 is a flow diagram illustrating a method for displaying summary data or a summary data subset according to an embodiment of the present disclosure.

FIG. 6 is a flow diagram illustrating a method for displaying summary data or a summary data subset according to an embodiment of the present disclosure.

Referring to FIG. 6, according to an embodiment of the present disclosure, at operation 61, the electronic device 101 may load at least one of text data, summary data, and a summary data subset which are stored in the memory 130. For example, the electronic device 101 may load the stored summary data, the stored summary data subset, or the stored related application program.

According to an embodiment of the present disclosure, at operation 62, the electronic device 101 may detect a user's action. Such a detected action may be one of various input signals for driving the electronic device 101 or an application program in the electronic device 101.

According to an embodiment of the present disclosure, at operation 63, the electronic device 101 may receive a signal of a user's request for a call log. If there is no signal for requesting a call log, the electronic device 101 may continuously perform operation 62.

If there is a signal of a user's request for a call log, the electronic device 101 may display a summary data subset together with a call log at operation 64. For example, the electronic device 101 may display a summary data subset through the display module 150.

According to an embodiment of the present disclosure, at operation 65, the electronic device 101 may receive a signal of a user's request for additional information about a summary data subset.

If there is a user's request for additional information of a summary data subset, the electronic device 101 may execute at least one template or application associated with the summary data subset at operation 66.

Additionally, if there is a user's request for information about the entire text data corresponding to the original of a summary data subset, the electronic device 101 may display the entire text data associated with the summary data subset through the display module 150. If there is a user's request for a non-structured simple summary (namely, rather than the form of a summary data subset), the electronic device 101 may display a part of summary data through the display module 150. If no template is determined from speech data, the electronic device 101 may display simple summary data.

If there is no user's request for additional information of a summary data subset, the electronic device 101 may receive a termination signal from a user at operation 67. When any termination signal is received from a user, the electronic device 101 may terminate the operation of the control module 170. If there is no termination signal from a user, the electronic device 101 may return to operation 64.

FIGS. 7A to 7E are example views illustrating a process of extracting summary data from a conversation according to an embodiment of the present disclosure.

FIG. 7A illustrates a conversation during a call connection between a user (USER) of the electronic device and another user (USER1) of other electronic device.

Referring to FIG. 7B, the electronic device 101 may record a call conversation, shown in FIG. 7C, segmented in a certain unit. For example, the electronic device 101 may convert segmented speech data into text data.

Referring to FIG. 7C, the electronic device 101 may search for a predefined keyword or key-phrase or a predefined entity from segmented text data shown in FIG. 7B. At this time, the electronic device 101 may mark a keyword or an entity, based on a predefined semantic class. A predefined keyword or a predefined entity may belong to a predefined semantic class. For example, a predefined semantic class may be a superordinate concept of a predefined keyword or a predefined entity. For example, a predefined semantic class may be a name of a person, a date, a time, or the like. For example, "Mike" may be an entity of the "personal name" class. Also, "Don't forget to" may be a keyword of the "request" class. Also, "buy" and "we ran out of" may be keywords of the "shopping" class. Also, "food" may be a keyword of the "food" class. Also, "bread", "salmon", "toilet paper", etc. may be entities of the "product" class.

Referring to FIG. 7D, the electronic device 101 may assign a class label, selected from predefined classes, to each segmented text data. Such a class label may be a superordinate concept including segmented text. Through this, the electronic device 101 may reflect a practical conversation of segmented text data in the context of a conversation. For example, a class label may be "suggest an action", "give", "confirm", "request information", "request action", or the like. For example, "POLITENESS_FORMULA" may be a class label with regard to "How are you?"

Referring to FIG. 7E, the electronic device 101 may search for a predefined topic associated with text data. In FIG. 7E, "Fact type" denotes "topic", and "key-phrase" denotes "keyword". Also, "utterance" denotes "segmented text data". The electronic device 101 may search for a predefined topic by verifying keywords and entities of specific classes from text data with an assigned label class. The electronic device 101 may define each topic type as a set of classes of keyword, entity, and class label. By analyzing segmented text data, the electronic device 101 may perform classification of mandatory or optional, order, or class labels of keyword and entity. This result of verification may become a confidence score that allows a current topic to be extracted. The electronic device 101 may create a list of topics having a confidence score and also assign keywords and entities to a corresponding topic. The electronic device 101 may select the "Shopping List" topic, based on information about keyword, entity, class, and class label found or assigned in FIG. 7D.

According to an embodiment of the present disclosure, if a confidence score of each topic in the list is higher than a user-defined threshold, the electronic device 101 may assign the topic to a template matched according to the type of each topic. The electronic device 101 may create a template according to a topic and thus form a subset of at least one predefined template. This subset of at least one predefined template may be one of summary data subsets. The electronic device 101 may display a subset of at least one template to a user in the form of text, pictogram, or any other UI item.

Figure 8A:
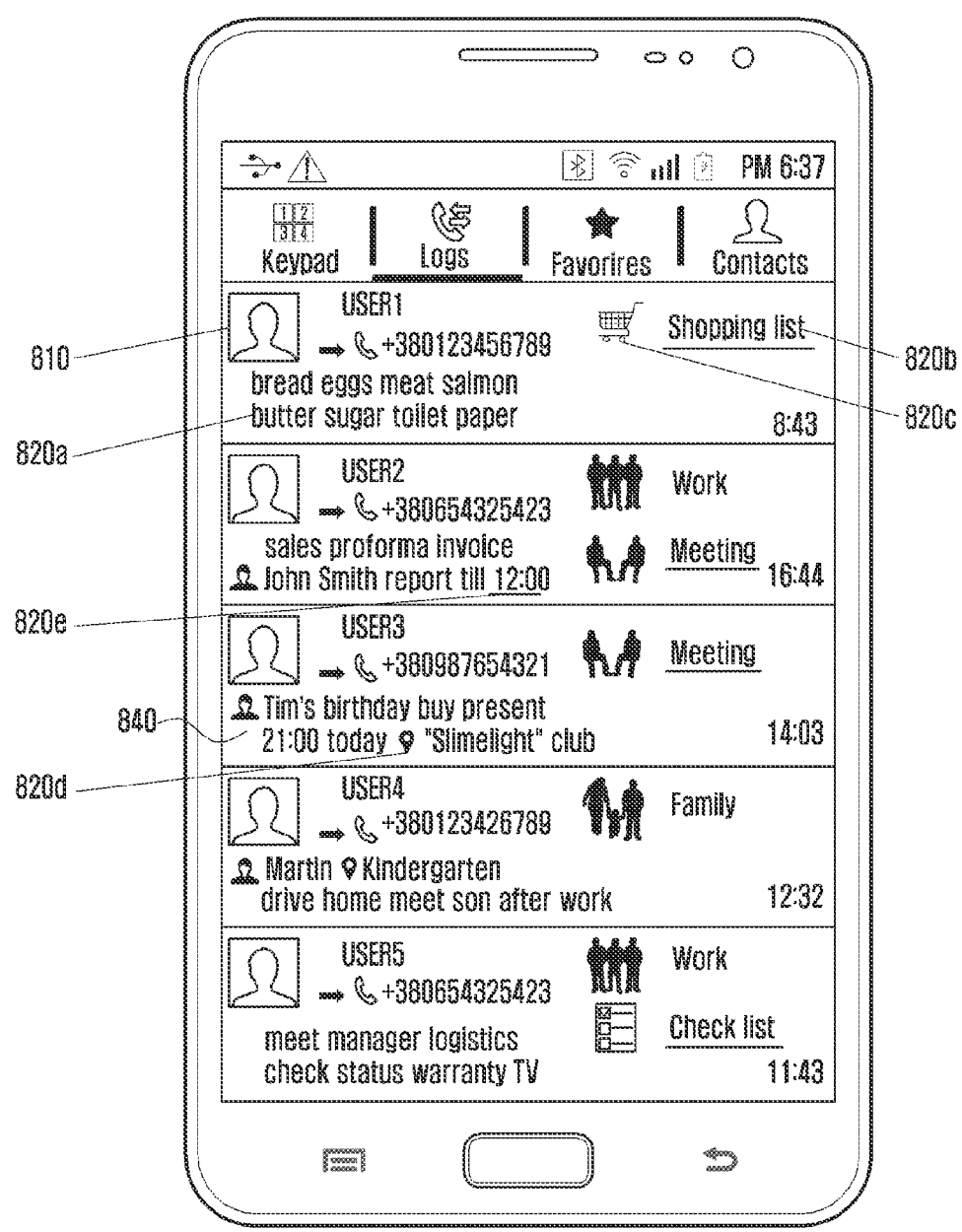
FIG. 8A is a screenshot illustrating a summary data subset displayed together with a call history according to an embodiment of the present disclosure.

FIG. 8A is a screenshot illustrating a summary data subset displayed together with a call history according to an embodiment of the present disclosure.

Referring to FIG. 8A, according to an embodiment of the present disclosure, the electronic device 101 may display a topic 820b of a conversation (as shown in FIG. 7A) and information 820a, 820c, 820d, or 830e about the topic, together with user's call history information 810, through the display module 150.

At least one subset 820 of summary data may be partial text of summary data, a keyword indicating a topic associated with summary data, an icon associated with a topic, or the like. Additionally, some subsets 820d and 820e of summary data may be application icons associated with summary data even though not related to a conversation as shown in FIG. 7A.

According to an embodiment of the present disclosure, the electronic device 101 may determine whether an additional information request signal for the summary data subset 820a, 820b, 820c, 820d or 820e is received. If such a signal is received, the electronic device 101 may display at least one template associated with the summary data subset 820a, 820b, 820c, 820d or 820e or execute at least one application associated with the summary data subset 820a, 820b, 820c, 820d or 820e. The electronic device 101 may simply represent a summary of a call conversation through the summary data subset 820a, 820b, 820c, 820d or 820e, or represent in detail it through at least one template or application.

For example, the summary data subset 820a may be implemented to be clickable, and also implemented in the form of text having color, brightness and chroma distinguished from other call log such that a user can easily recognize it to be clickable. When a user clicks the summary data subset 820a, the electronic device 101 may display the entire text data or the entire summary data containing text of the summary data subset 820a. For example, the electronic device 101 may display the entire text data as shown in FIG. 7A or display "bread, eggs, meat, salmon, butter, sugar, toilet paper, rice" which are the entire summary data of the summary data subset 820a.

In another example, the summary data subset 820b may be implemented to be clickable, and also implemented in the form of a keyword message corresponding to a topic of the summary data subset 820b. Also, the electronic device 101 may display the summary data subset 820b with an underlined form of the keyword message. When a user clicks the summary data subset 820b, the electronic device 101 may display a new window of a template and summary data corresponding to the summary data subset 820b. For example, the electronic device 101 may display the entire text data as shown in FIG. 7A or display "bread, eggs, meat, salmon, butter, sugar, toilet paper, rice" which are the entire summary data of the summary data subset 820b.

In another example, the summary data subset 820c may be implemented to be clickable, and also implemented in the form of an icon associated with a topic of the summary data subset 820c. When a user clicks the summary data subset 820c, the electronic device 101 may display a new window of a template and summary data corresponding to the summary data subset 820c. For example, the electronic device 101 may display the entire text data as shown in FIG. 7A or display "bread, eggs, meat, salmon, butter, sugar, toilet paper, rice" which are the entire summary data of the summary data subset 820c.

In another example, the summary data subset 820d may be implemented to be clickable, and also implemented in the form of an application icon associated with the summary data subset 820d. When a user clicks the summary data subset 820d, the electronic device 101 may execute an application corresponding to the summary data subset 820d. For example, the electronic device 101 may execute a location-related application program associated with the location "slimelight club" 840.

In another example, the summary data subset 820e may be implemented to be clickable, and also implemented in the form of application text associated with the summary data subset 820e. When a user clicks the summary data subset 820e, the electronic device 101 may execute an application corresponding to the summary data subset 820e. For example, the electronic device 101 may execute an application such as a timetable or calendar associated with a meeting time.

Figure 8B:
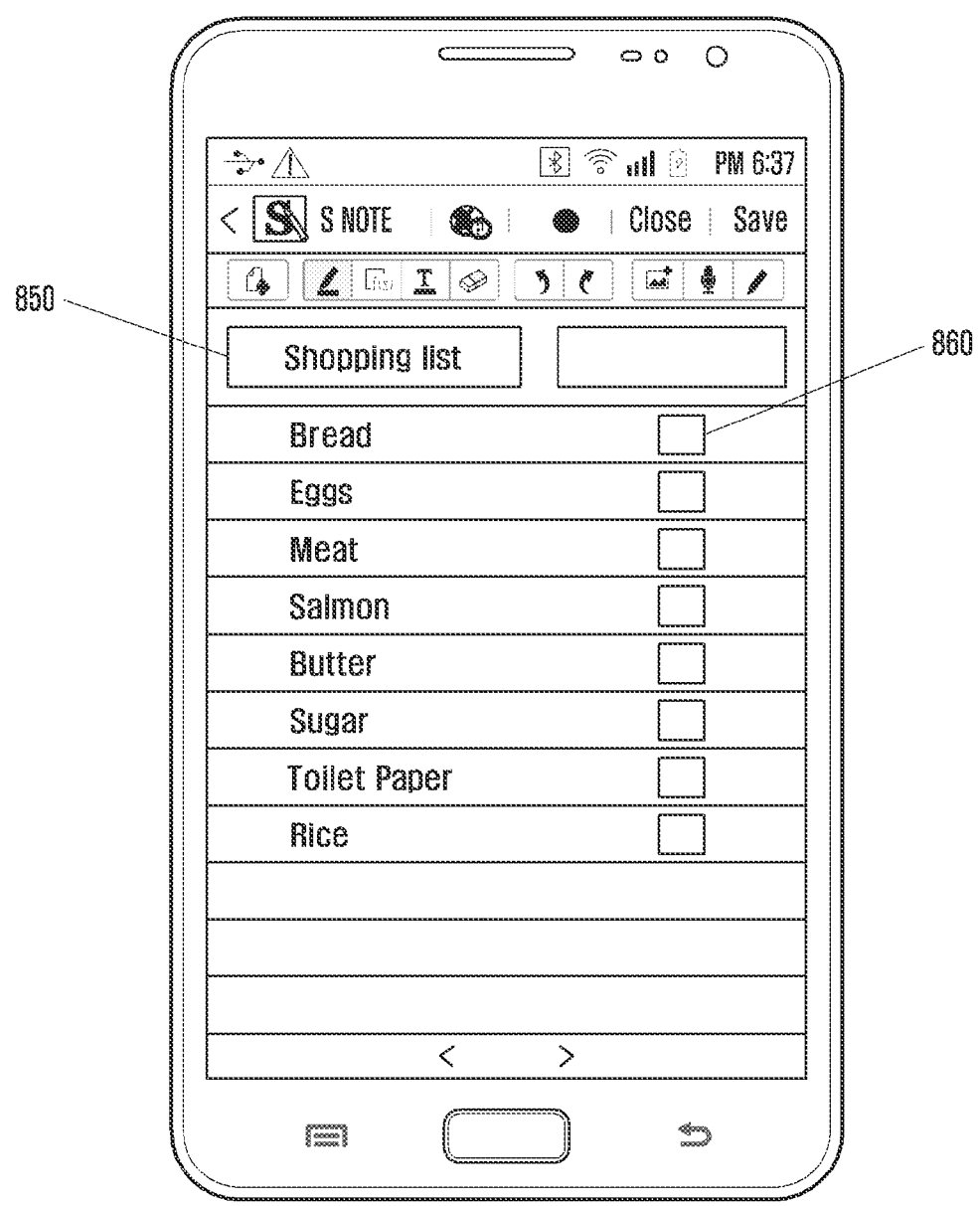
FIG. 8B is a screenshot illustrating additional information associated with a summary data subset according to an embodiment of the present disclosure.

FIG. 8B is a screenshot illustrating additional information associated with a summary data subset according to an embodiment of the present disclosure.

Referring to FIG. 8B, according to an embodiment of the present disclosure, if any additional information request signal for the summary data subset 820a, 820b or 820c is received, the electronic device 101 may execute at least one template associated with the summary data subset 820a, 820b or 820c. For example, when a user clicks the summary data subset 820b or 820c associated with "Shopping List", the electronic device 101 may display a stored template of "Shopping List" 850 through a new window. Additionally, the electronic device 101 may have a UI component that allows a user to check a purchased item in the "Shopping List" 860. This function of checking items may be activated or not when a corresponding template is determined.

For example, the electronic device 101 may extract at least one topic from summary data extracted according to a predefined user rule and then determine at least one template corresponding to the extracted topic. If the extracted topic is "shopping", the electronic device 101 may determine "shopping-list-check-template" (which may be a template purchasable in the app store). The electronic device 101 may create a structured summary data subset by determining "shopping-list-check-template" and also insert summary data into the created "shopping-list-check-template". Additionally, the electronic device 101 may have a check box that allows a user to check shopping items displayed as summary data on the "shopping-list-check-template".

In another example, the electronic device 101 may classify text data, converted using a template-based summarizing algorithm, according to topics and then extract summary data from the classified text data of each topic. For example, the electronic device 101 may recognize text data associated with shopping and classify text data according to topics by determining "shopping-list-check-template" as a related template. The electronic device 101 may select a summarizing algorithm corresponding to the "shopping-list-check-template", based on a program, application, or semantic web technique. For example, the electronic device 101 may extract words (i.e., summary data) associated with shopping from among text data by using a summarizing algorithm of the "shopping-list-check-template". Additionally, the electronic device 101 may have a check box that allows a user to check shopping items displayed as summary data on the "shopping-list-check-template".

Figure 9A:
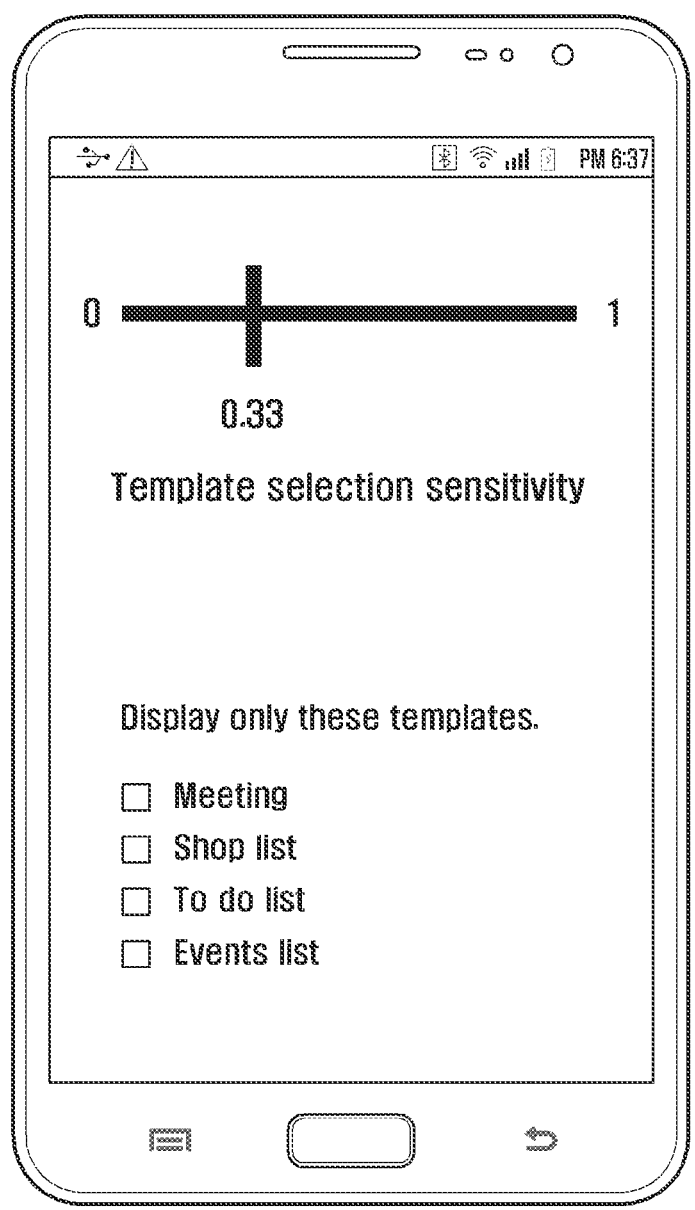
FIGS. 9A and 9B are screenshots illustrating an operation of setting a user-defined threshold according to an embodiment of the present disclosure.
Figure 9B:
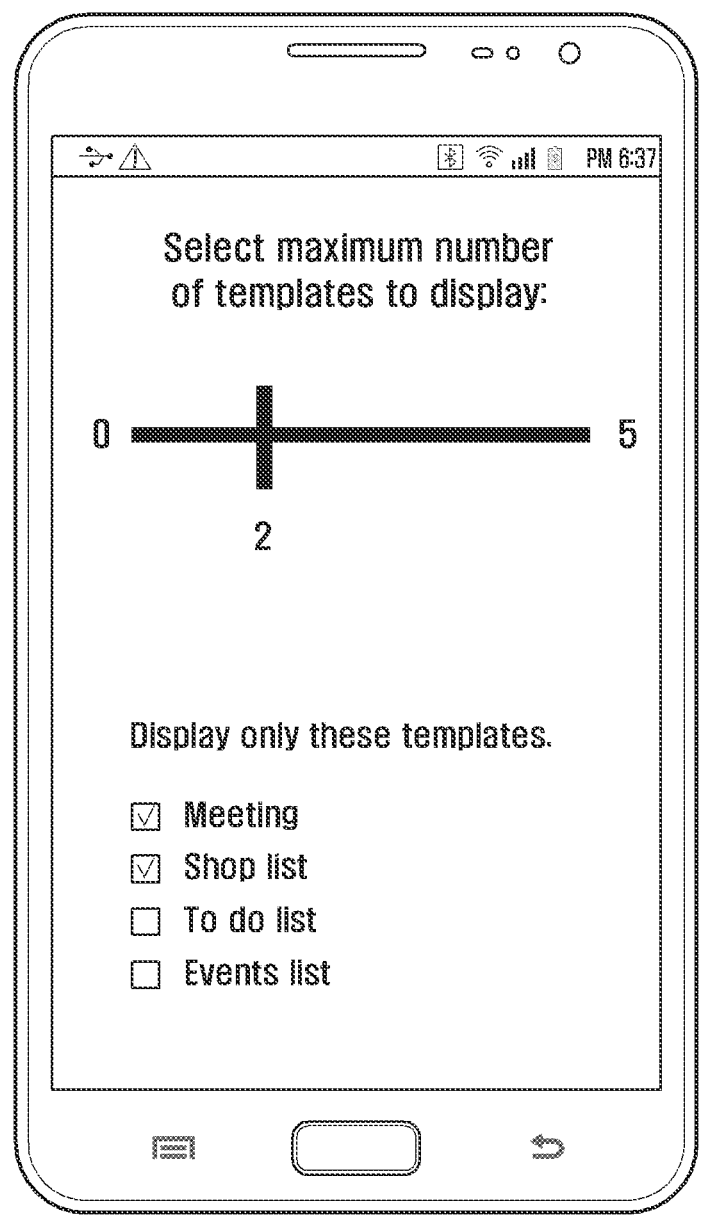

FIGS. 9A and 9B are screenshots illustrating an operation of setting a user-defined threshold according to an embodiment of the present disclosure.

Referring to FIG. 9A, according to an embodiment of the present disclosure, in connection with the user-defined threshold previously discussed in FIG. 7E, the electronic device 101 may receive an input of the user-defined threshold from a user. When a certain topic has a confidence score higher than the user-defined threshold input, the electronic device 101 may assign the topic to a related template. A confidence score may indicate that the determined topic (or fact) is identical to a superordinate concept of keywords used in a conversation. For example, a confidence score may refer to a numeric value when each superordinate concept of keywords used in a conversation is identical to a currently determined topic. The electronic device 101 may compare the user-defined threshold, set manually between zero and one, with the confidence score. One or more templates offered together with confidence scores may be sorted according to such scores, and the electronic device 101 may display the user's desired number of templates on the display module 150. Also, the electronic device 101 may receive a user's selection for a specific template through a check box. And also, the electronic device 101 may receive a user's input for the maximum number of templates being displayable on the display module 150. For example, FIG. 9B illustrates that a user selects two templates "Shopping list" and "To do list" through the touch screen.

According to an embodiment of the present disclosure, through the display module 150, the electronic device 101 may display at least one template associated with a summary data subset in a new window, in an overlap form with call history information, or in a thumbnail image.

According to the above-discussed method for displaying call information in the electronic device, the electronic device can display summary data associated with a call conversation through various visualization materials, so that a user can easily and immediately remember a call conversation.

According to the above-discussed method for displaying call information in the electronic device, the electronic device can create more exact summary data associated with a call conversation on the basis of various types of data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying call information in an electronic device, the method comprising:
    receiving, from a call conversation, speech from a user of the electronic device and speech from a call counterpart;
    receiving at least one sensor data associated with call information;
    extracting data from the received speech from the user of the electronic device and the received speech from the call counterpart;
    determining a topic of the call conversation, based on a background noise information, and at least one of the extracted data and the received at least one sensor data, wherein the background noise information is extracted from the speech from the user of the electronic device;
    displaying information related to the determined topic of the call conversation and an icon associated with the determined topic together with a call history of the user of the electronic device; and
    in response to receiving a user input on the icon, activating at least one application associated with the determined topic,
    wherein the at least one sensor data is unrelated to the received speech from the user of the electronic device or the received speech from the call counterpart.

2. The method of claim 1, wherein the determining of the topic of the call conversation comprises determining the topic of the call conversation, based on at least one of a user's log associated with the extracted data, metadata associated with the extracted data, and a frequency of text in the extracted data.

3. The method of claim 1, wherein the determining of the topic of the call conversation comprises:
    displaying the extracted data, and
    receiving an input for the topic of the call conversation from the user of the electronic device.

4. The method of claim 1, further comprising:
    creating at least one summary data subset associated with the topic of the call conversation among the extracted data,
    wherein information about the determined topic of the call conversation comprises the created at least one summary data subset.

5. The method of claim 4, wherein the summary data subset comprises a template containing a part or all of the extracted data.

6. The method of claim 5, further comprising:
    receiving an input for a number of templates comprising the summary data subset from the user of the electronic device through a user interface (UI) menu.

7. The method of claim 4, wherein the summary data subset is created in a form of at least one of text, icon, thumbnail, table, chart, graph, map, or emoticon in connection with the topic of the call conversation.

8. The method of claim 1, further comprising:
    receiving an additional information request signal for the displayed information, when the additional information request signal is received, displaying at least one template created in advance or executing at least one application associated with the topic of the call conversation, is executed.

9. The method of claim 8, wherein the at least one template is displayed in a new window, in an overlap form with the call information, or in a thumbnail image together with the call history of the user of the electronic device.

10. An electronic device, comprising:
an audio receiver configured to receive, from a call conversation, speech from a user of the electronic device;
a transceiver configured to receive, from the call conversation, speech from a call counterpart;
at least one sensor configured to receive at least one sensor data associated with call information;
a display; and
at least one processor configured to:
extract data from the received speech of the user of the electronic device and the call counterpart,
determine a topic of the call conversation, based on a background noise information, and at least one of the extracted data and the received at least one sensor data, wherein the background noise information is extracted from the speech from the user of the electronic device,
display to the display, information related to the determined topic of the call conversation and an icon associated with the determined topic together with a call history of the user of the electronic device, and
in response to receiving a user input on the icon, activate at least one application associated with the determined topic,
wherein the at least one sensor data is unrelated to the received speech from the user of the electronic device or the received speech from the call counterpart.

11. The electronic device of claim 10, wherein the at least one processor is further configured to determine the topic of the call conversation, based on at least one of a user's log associated with the extracted data, metadata associated with the extracted data, and a frequency of text in the extracted data.

12. The electronic device of claim 10, wherein the at least one processor is further configured to:
display the extracted data through the display, and
receive an input for the topic of the call conversation from the user of the electronic device.

13. The electronic device of claim 10,
wherein the at least one processor is further configured to create at least one summary data subset associated with the topic of the call conversation among the extracted data, and
wherein information about the determined topic of the call conversation comprises the created at least one summary data subset.

14. The electronic device of claim 13, wherein the at least one processor is further configured create the summary data subset by inserting a template, comprising a part or all of the extracted data, into the summary data subset.

15. The electronic device of claim 14, wherein the at least one processor is further configured to receive, by the display, an input for a number of templates comprising the summary data subset from the user of the electronic device through a user interface (UI) menu.

16. The electronic device of claim 13, wherein the at least one processor is further configured to create the summary data subset in a form of at least one of text, icon, thumbnail, table, chart, graph, map, or emoticon in connection with the topic of the call conversation.

17. The electronic device of claim 10, wherein the at least one processor is further configured to:
receive an additional information request signal for the displayed information through the display, and
when the additional information request signal is received, display at least one template created in advance through the display, or execute at least one application associated with the topic of the call conversation.

18. The electronic device of claim 17, wherein the at least one processor is further configured to display, by the display, the at least one template in a new window, in an overlap form with the call information, or in a thumbnail image together with the call history of the user of the electronic device.

* * * * *